Oct. 15, 1929.    C. W. TODD    1,731,511
LOCOMOTIVE FRAME AND METHOD OF MANUFACTURING THE SAME
Filed March 28, 1928    6 Sheets-Sheet 1
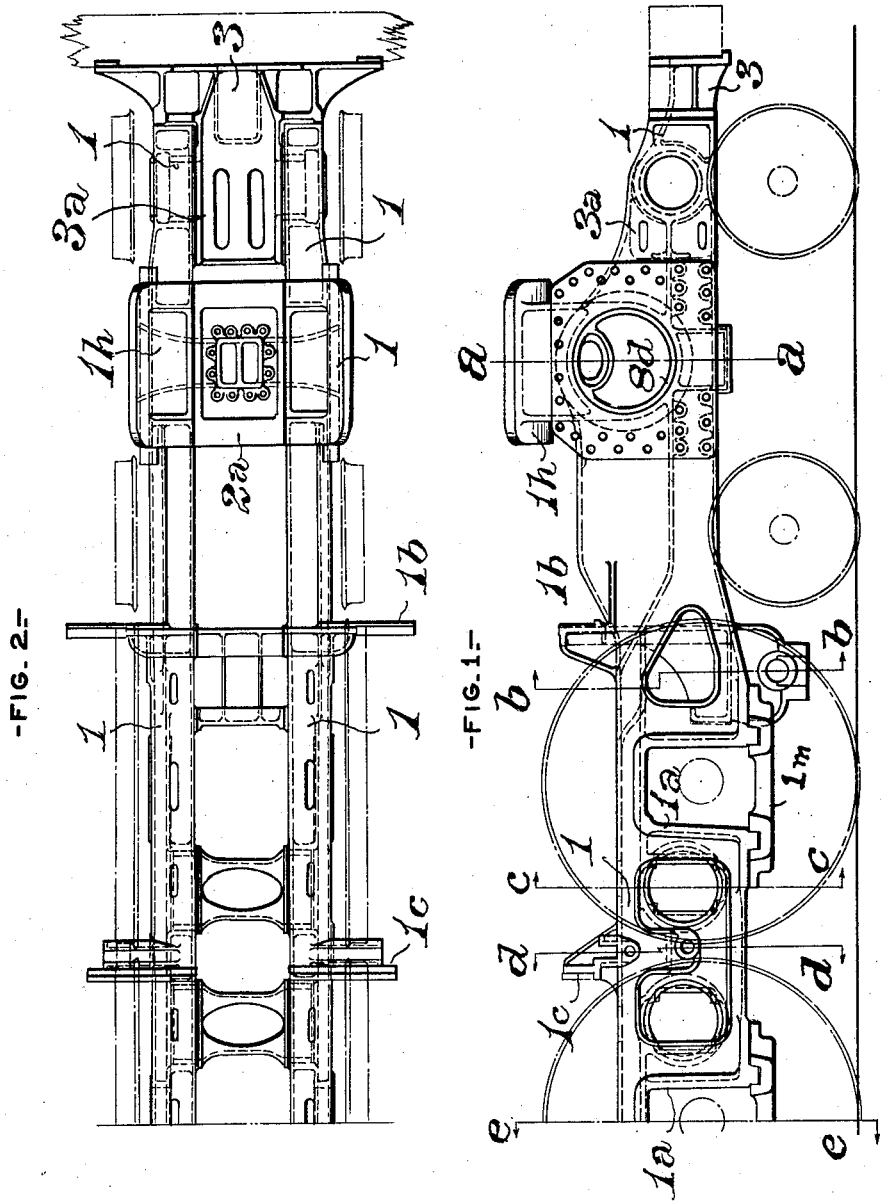

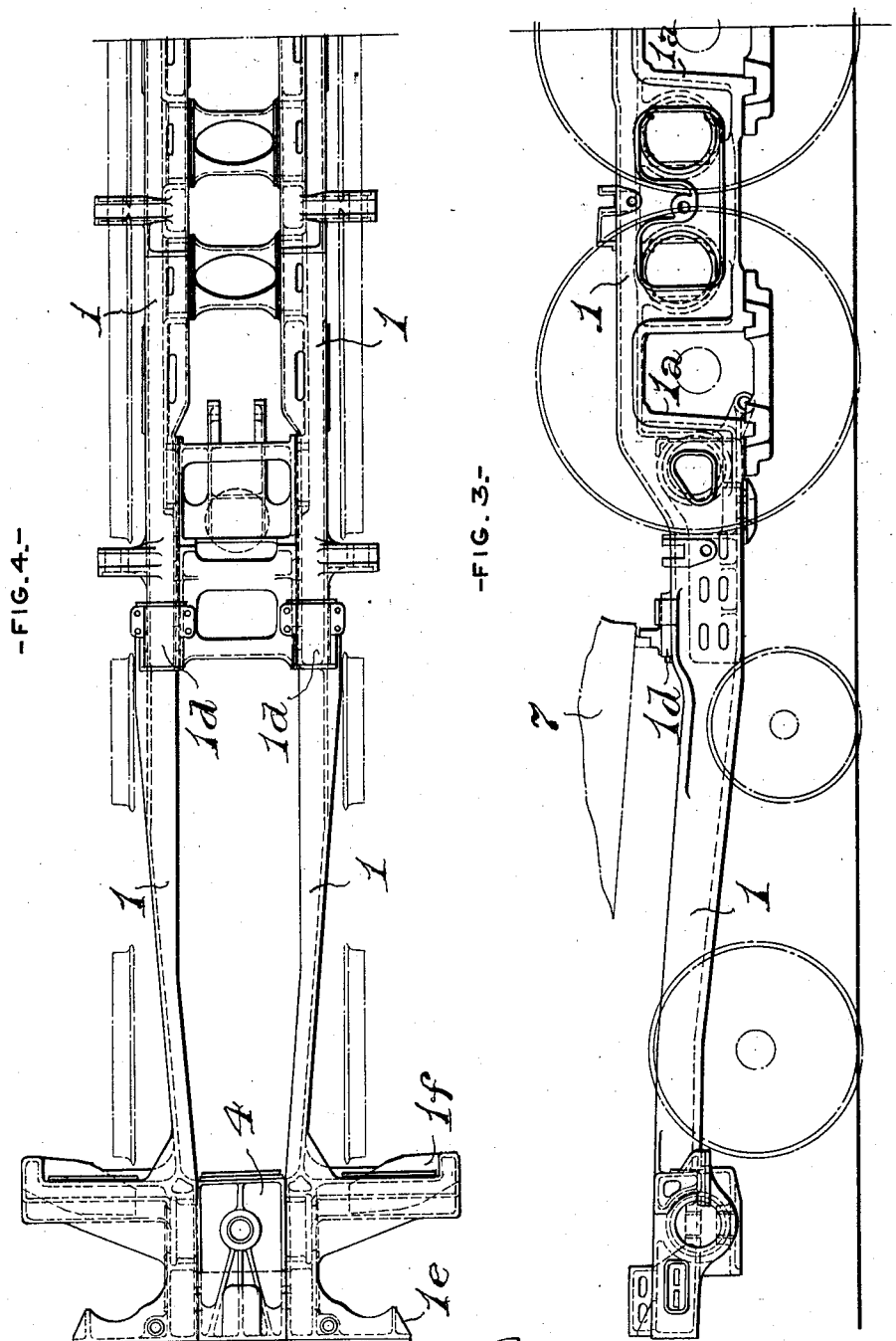

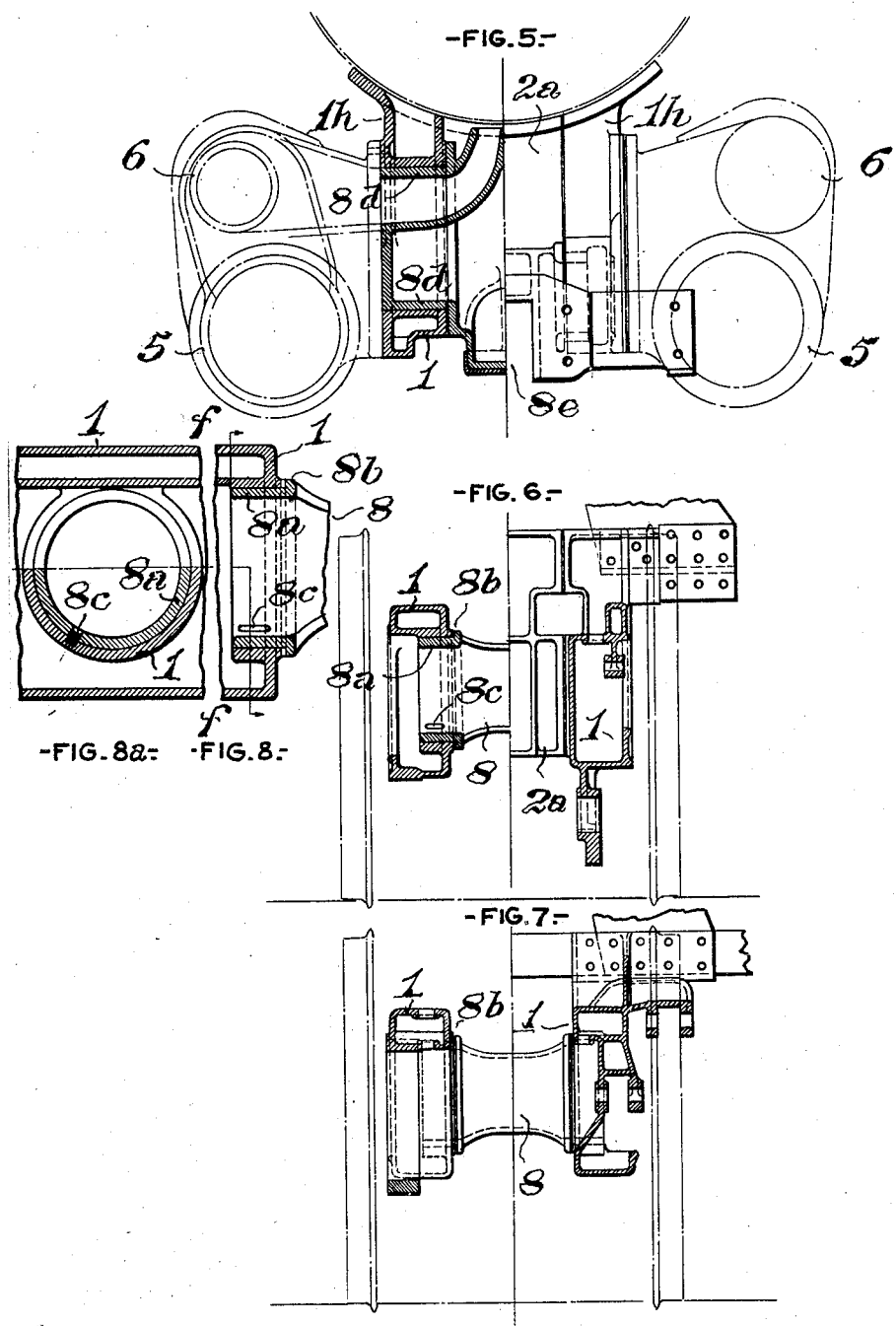

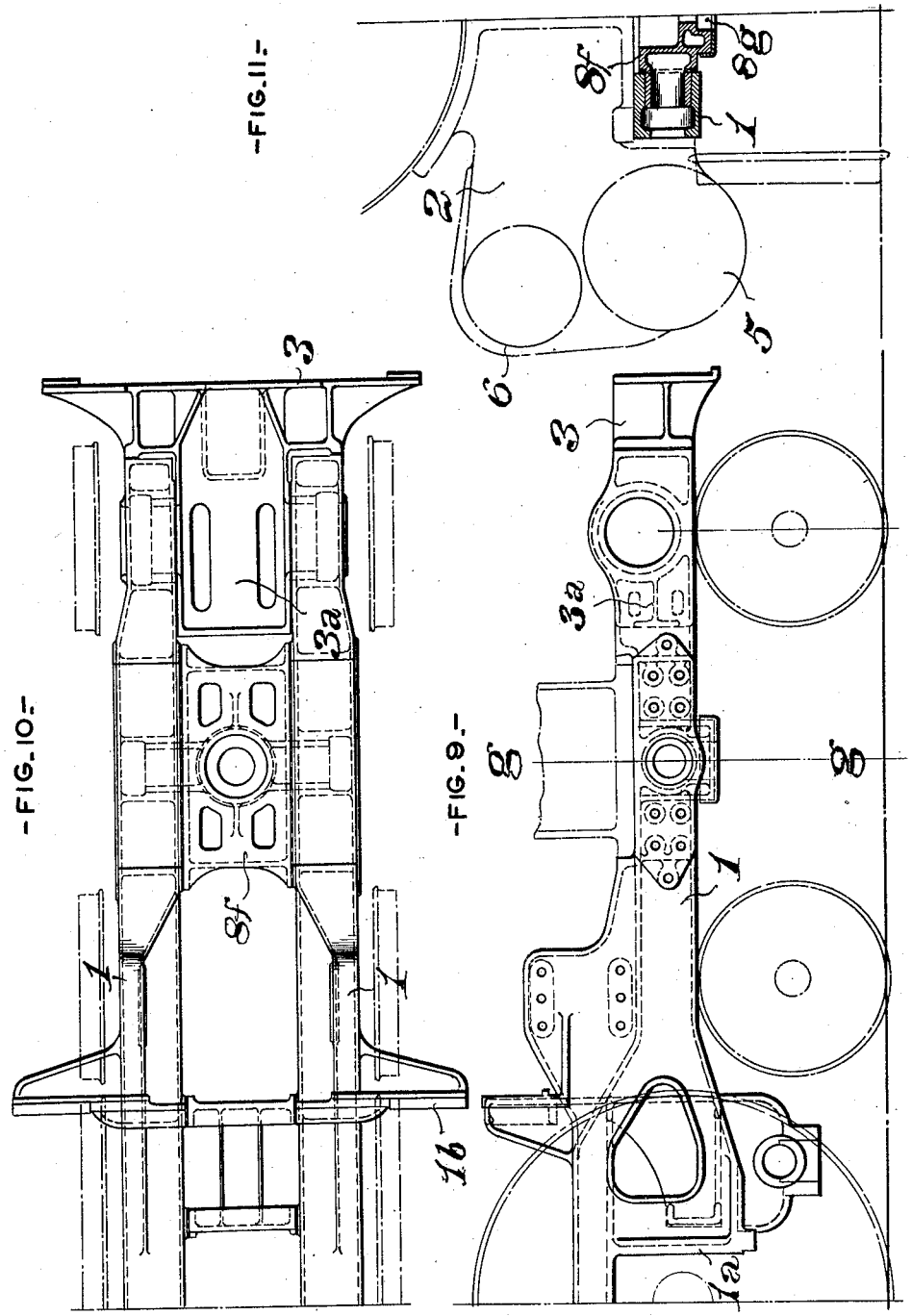

Oct. 15, 1929.   C. W. TODD   1,731,511
LOCOMOTIVE FRAME AND METHOD OF MANUFACTURING THE SAME
Filed March 28, 1928   6 Sheets-Sheet 5
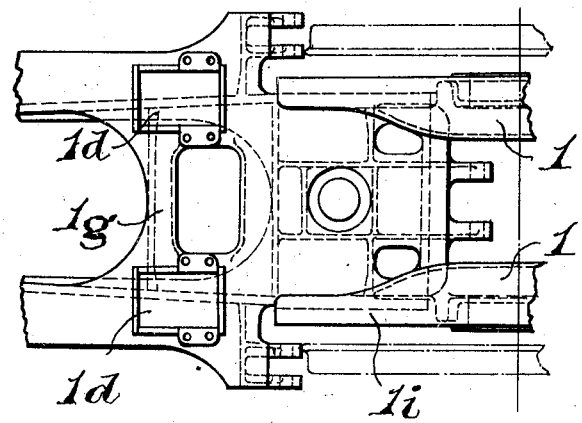
-FIG. 12.-
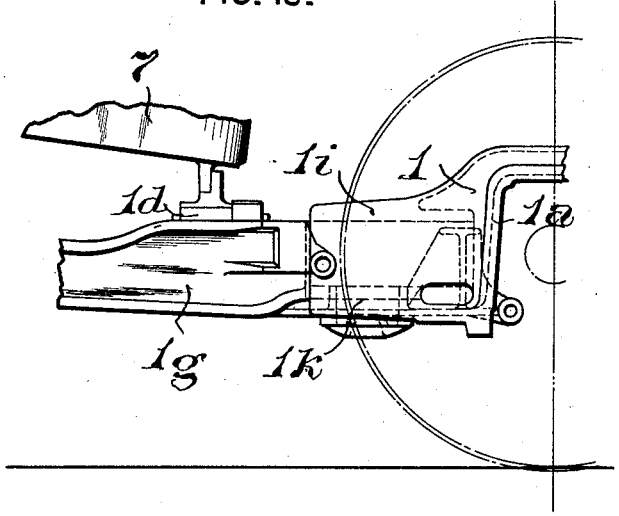
-FIG. 13.-

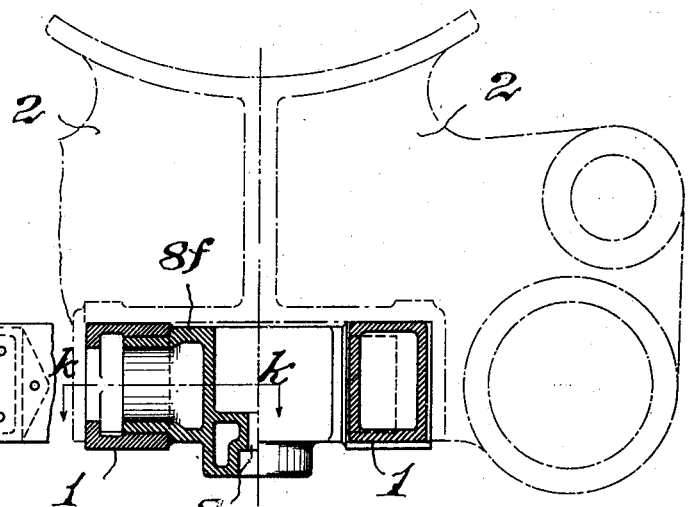
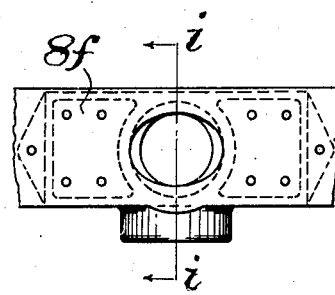
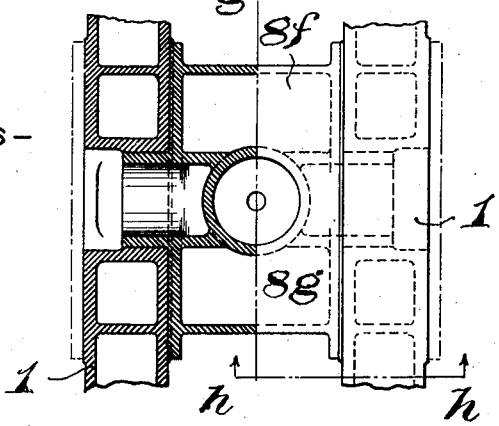

Patented Oct. 15, 1929

1,731,511

UNITED STATES PATENT OFFICE

CHARLES W. TODD, OF SCHENECTADY, NEW YORK

LOCOMOTIVE FRAME AND METHOD OF MANUFACTURING THE SAME

Application filed March 28, 1928. Serial No. 265,388.

This invention relates to the supporting frames of locomotive engines and methods of manufacturing the same, and its object is to provide a fabricated structure of such type, which will be of strong and simple construction; economical in cost of manufacture; effect a substantial reduction in the number of separate and connected accessory members; and ensure accurate alignment of its side members, by permitting the necessary boring and slotting thereof to be performed in pairs.

The improvement claimed is hereinafter fully set forth.

In the accompanying drawings: Figure 1 is a side view, in elevation, of the forward portion of a locomotive frame, illustrating an embodiment of the invention; Fig. 2, a plan or top view thereof; Fig. 3, a view, taken similarly to Fig. 1, of the rear portion of the same frame; Fig. 4, a view, taken similarly to Fig. 2, of said rear portion; Fig. 5, a view, the right hand half of which is a front elevation of said frame, and the left hand half, a vertical transverse section on the line $a\,a$ of Fig. 1; Fig. 6, a vertical transverse section, the right hand half being taken on the line $b\,b$ of Fig. 1, and the left hand half, on the line $c\,c$ thereof; Fig. 7, a similar section, the right and left hand halves being taken on the lines $d\,d$ and $e\,e$, respectively, of Fig. 1; Fig. 8, a partial vertical transverse section, on the line $c\,c$ of Fig. 1; Fig. $8^a$, a vertical longitudinal section, on the line $f\,f$, of Fig. 8; Fig. 9, a side view, in elevation, of the forward portion of a locomotive frame, illustrating a structural modification; Fig. 10, a plan or top view of the same; Fig. 11, a vertical transverse section, on the line $g\,g$ of Fig. 9; Fig. 12, a plan or top view, illustrating a structural modification of the rear portion of the frame; Fig. 13, a side view, in elevation, of the same; Fig. 14, a front view, partly in elevation, the lower portion of the right hand half of which is in transverse section, on the line $h\,h$ of Fig. 16, and the lower portion of the left hand half, in section, on the line $i\,i$ of Fig. 15; Fig. 15, a partial side view, and; Fig. 16, a view, the right hand half of which is a partial plan or top view, and the left hand half, a partial horizontal section, on the line $k\,k$ of Fig. 14. Figs. 14 to 16 inclusive, illustrate another structural modification.

In the practice of the invention, referring descriptively to the specific embodiment thereof which is herein exemplified, the frame comprises two counterpart side members, 1, 1, which are preferably, but not necessarily, of hollow or box section, and accessory members hereinafter described. A plurality of pairs of pedestal jaws, $1^a$, adapted for the reception of axle boxes in the ordinary manner, is formed integral with each of the side members, and a portion of a cylinder saddle, $1^h$, is also formed integral with, or secured to the forward portion of each of said side members. Each side frame is formed with pedestal jaw connections $1^m$, in the form of vertical walls interposed between the respective pairs of pedestal jaws. A bumper bracket, 3, having a rearward extension, $3^a$, which is interposed between the side members, is secured to the front ends thereof; and a draw bar pocket, 4, is interposed between, and secured to, the side members, at the rear ends thereof. A cylinder, 5, and distribution valve chest, 6, indicated in outline in Figs. 5, 11, and 14, are shown formed separately from the side members, but may if desired be formed integrally therewith. Supports, $1^b$ and $1^c$, for valve gear parts and others, are formed integral with each side member.

As shown in Figs. 3 and 4, the rear portions of the side frame members, 1, 1, which are designed to extend below the firebox, 7, of the locomotive, are formed integral with the forward portions thereof, and are provided with integral seats, $1^d$, on their tops, for the support of the front end of the firebox. The draw bar pocket, 4, forms the rear connection of the side members, extending longitudinally between, and being secured to, their rear ends, and laterally projecting supports, $1^e$ and $1^f$, are formed integral with the side frame members, adjacent to the front and rear of the draw bar pocket, upon which supports the cab and the truck centering appliance are carried.

In the structural modification shown in

Figs. 12 and 13, the rear portion of the frame is in the form of a cradle, $1^g$, which supports the firebox, 7, and is itself supported on a trailing truck, (not shown) in the usual manner. The forward portion of the cradle is fitted between upper and lower flanges, $1^i$ and $1^k$, at the rear ends of the main portions of the frames 1—1, and is bolted or otherwise rigidly secured thereto. The cradle is provided with suitable supports, on its top, for the front end of the firebox, and is adapted for the application of a booster, if desired to be made.

In the construction shown in Figs. 1, 2, and 5, a central cylinder saddle member, $2^a$, is interposed between, and secured, to the frame members, 1, 1, upon each of which there is formed an upwardly extending supplemental saddle section, $1^h$, the top surface of which is in conformity, as to alignment and shape, with that of the saddle member, $2^a$. A cylinder, 5, having an integral distribution valve chest, 6, is secured, rigidly and detachably, to each side member and its supplemental saddle section. In the structural modification shown in Figs. 14 to 16 inclusive, a half cylinder saddle, 2, is connected to each side frame member, and a cylinder, 5, and distribution valve chest, 6, are indicated, in outline, as also formed integral with each half saddle.

The side frame members are connected, at different points in their length, by cross tie members, disposed between the pairs of pedestal jaws, and in front and rear thereof, in the following manner and form. Referring more particularly to Figs. 6 to $8^a$ inclusive, the cross tie members comprise a tubular cylindrical body, 8, and integral tubular cylindrical end junction sections, $8^a$, circumferential flanges, $8^b$, adapted to abut against the inner sides of the side frame members, being formed on the inner ends of the junction sections. The junction sections, are force-fitted, and pressed into, openings in the side members, 1, 1, corresponding in diameters and axial relation with them, and with the bodies of the cross tie members, and are firmly secured to the side frame members, by welding and by keys, $8^c$. In my copending application filed March 28, 1928, Ser. No. 365,387, there is described a well known method of atomic hydrogen fused arc welding which produces satisfactory welds for connecting the parts of the present structure, but it is within the contemplation of the invention to employ any other suitable method of welding. The side frame members are additionally connected, one to the other, at their front and rear ends, as before explained, by the interposed bumper bracket, 3, and draw bar pocket, 4, respectively, and are secured thereto by welding.

In the construction shown in Fig. 5, the central cylinder saddle member, $2^a$, is connected to the side frame members, 1, 1, by short cylindrical tie members, $8^d$, which project, in line axially, from the sides of the central cylinder saddle member, and are rigidly secured to the side frame members and the supplemental saddle sections, $1^h$, thereof preferably by welding and keying, in the same manner as the junction sections of the cross tie members above described. The central cylinder sadde member, $2^a$, is, further, downwardly extended, in its middle longitudinal and transverse planes, to form a truck centre pin socket, $8^e$. The structural modifications shown in Fig. 11 and in Figs. 14 to 16 inclusive, embody a substantially similar form and manner of connection of the side frame members beneath the cylinder saddles, 2, and the provision of a truck centre pin socket. The difference between the two forms is, that, as shown in Fig. 5, the central cylinder saddle member, $2^a$, is interposed directly between the two side frame members, while, as shown in Figs. 11, 14, 15 and 16, an independent transversely extending tie member, $8^f$, in which a truck centre pin socket, $8^g$, is formed, is interposed between the side frame members.

The invention claimed and desired to be secured by Letters Patent, is:

1. In a fabricated locomotive frame structure, the combination of two side members, each comprising, in an integral part, a top rail, pedestal jaws, depending therefrom, and pedestal jaw connections; and cross tie members, connecting said side members, and having their end portions fitted, and secured, rigidly, in corresponding openings, in the side members.

2. In a fabricated locomotive frame structure, the combination of two side members, each comprising, in an integral part, a top rail, of box or hollow section, pedestal jaws, depending therefrom, and pedestal jaw connections; and cross tie members, connecting said side members, and having their end portions fitted, and secured, rigidly, in corresponding openings, in the side members.

3. In a fabricated locomotive frame structure, the combination of two side members, each comprising, in an integral part, a top rail, pedestal jaws, depending therefrom, and pedestal jaw connections; and tubular cross tie members, connecting said side members, said cross tie members being pressed in openings, of corresponding diameter, in the side members.

4. In a fabricated locomotive frame structure, the combination of two side members, each comprising, in an integral part, a top rail, pedestal jaws, depending therefrom, and pedestal jaw connections; and tubular cross tie members, connecting said side members, said cross tie members being pressed in openings, of corresponding diameter, in the side members, and secured therein by a weld.

5. In a fabricated locomotive frame structure, the combination of two side members, each comprising, in an integral part, a top rail, pedestal jaws, depending therefrom, and pedestal jaw connections; and tubular cross tie members, connecting said side members, said cross tie members being fitted in openings, of corresponding diameter, in the side members, and secured therein by a weld and a key.

6. In a fabricated locomotive frame structure, the combination of two side members, each comprising, in an integral part, a top rail, pedestal jaws, depending therefrom, and pedestal jaw connections; and tubular cross tie members, connecting said side members, said cross tie members being fitted in openings, of corresponding diameter, in the side members, abutting against them by peripheral flanges, and being secured to them by a weld.

7. In a fabricated locomotive frame structure, the combination of two side members, each comprising, in an integral part, a top rail, pedestal jaws, depending therefrom, pedestal jaw connections, and an upwardly extending supplemental cylinder saddle member; and a central cylinder saddle member, interposed between, and rigidly secured to, the side members between the supplemental cylinder saddle members.

8. In a fabricated locomotive frame structure, the combination of two side members, each comprising, in an integral part, a top rail, pedestal jaws, depending therefrom, pedestal jaw connections, and an upwardly extending supplemental cylinder saddle member; and a central cylinder saddle member, interposed between, and rigidly secured to, the side members between the supplemental cylinder saddle members, said central cylinder saddle member having a downward extension, in which there is formed a truck centre pin socket.

9. In a fabricated locomotive frame structure, the combination of two side members, each comprising, in an integral part, a top rail, pedestal jaws, depending therefrom, pedestal jaw connections, and an upwardly extending supplemental cylinder saddle member; a central cylinder saddle member, interposed between, and rigidly secured to, the side members between the supplemental cylinder saddle members; and a cylinder and valve chest, secured to each of the side members.

10. In a fabricated locomotive frame structure, the combination of two side members, each comprising, in an integral part, a top rail, pedestal jaws, depending therefrom, and pedestal jaw connections; and integral cylinder saddle member, cylinder, and valve chest, on each side member; and a cross tie member, interposed between, and secured to, the side members, below the saddle.

11. In a fabricated locomotive frame structure, the combination of two side members, each comprising, in an integral part, a top rail, pedestal jaws, depending therefrom, and pedestal jaw connections; and integral cylinder saddle member, cylinder, and valve chest, on each side member; and a cross tie member, interposed between, and secured to the side members, below the saddle, said cross tie member having formed in it, a truck centre pin socket.

12. In a fabricated locomotive frame structure, the combination of two side members, each comprising, in an integral part, a top rail, pedestal jaws, depending therefrom, pedestal jaw connections, and a cylinder saddle, cylinder, and valve chest; and a cross tie member, interposed between, and secured to, the side members, below the saddle.

13. In a fabricated locomotive frame structure, the combination of two side members, each comprising, in an integral part, a top rail, pedestal jaws, depending therefrom, and pedestal jaw connections; and a cross tie member connecting the side members and having its end portions fitted and secured rigidly in corresponding openings in the side members to constitute a bumper bracket, having a rear extension interposed between, and fitted against, the forward portions of the side members.

14. In a fabricated locomotive frame structure, the combination of two side members, each comprising, in an integral part, a top rail, pedestal jaws, depending therefrom, and pedestal jaw connections; and a draw bar pocket, interposed between, and fitted against the rear portions of the side members, and having cylindrical end portions which are fitted in openings, of corresponding diameter, in the side members.

15. In a fabricated locomotive frame structure, the combination of two side members, each comprising, in an integral part, a top rail, pedestal jaws, depending therefrom, and pedestal jaw connections; a cross tie member connecting the side members and having its end portions fitted and secured rigidly in corresponding openings in the side members; an independent cradle having its forward portion interposed between, and fitted against, the side members, between upper and lower flanges thereon; and means for rigidly securing the cradle to the side members.

16. The improvement in the method of manufacturing fabricated locomotive frames, which consists in rigidly connecting two side members, each comprising, in an integral part, a top rail, pedestal jaws, depending therefrom, and pedestal jaw connections, by fitting cross tie members, of length proper to space the side members at a determined distance apart, and having tubular cylindrical end portions, in openings in the side members, of diameters corresponding with those of the end portions of the cross tie members, and securing said end portions in said openings.

17. The improvement in the method of manufacturing fabricated locomotive frames, which consists in rigidly connecting two side members, each comprising, in an integral part, a top rail, pedestal jaws, depending therefrom, and pedestal jaw connections, by fitting cross tie members, of length proper to space the side members at a determined distance apart, and having tubular cylindrical end portions, in openings in the side members, of diameters corresponding with those of the end portions of the cross tie members, and securing said end portions in said openings by force-fitting them therein.

18. The improvement in the method of manufacturing fabricated locomotive frames, which consists in rigidly connecting two side members, each comprising, in an integral part, a top rail, pedestal jaws, depending therefrom and pedestal jaw connections, by fitting cross tie members, of length proper to space the side members at a determined distance apart, and having tubular cylindrical end portions, in openings in the side members, of diameters corresponding with those of the end portions of the cross tie members, and securing said end portions in said openings by force-fitting them therein and welding.

19. The improvement in the method of manufacturing fabricated locomotive frames, which consists in rigidly connecting two side members, each comprising, in an integral part, a top rail, pedestal jaws, depending therefrom, and pedestal jaw connections, by fitting cross tie members, of length proper to space the side members at a determined distance apart, and having tubular cylindrical end portions, in openings in the side members, of diameters corresponding with those of the end portions of the cross tie members, and securing said end portions in said openings, by force-fitting them therein, welding, and keying.

CHARLES W. TODD.